United States Patent [19]
Helmich et al.

[11] Patent Number: 5,488,827
[45] Date of Patent: Feb. 6, 1996

[54] APPARATUS AND METHOD FOR MOUNTING AND OPERATING MULTILE TURBOCHARGERS IN PARALLEL

[75] Inventors: Melvin J. Helmich, Mount Vernon, Ohio; Richard C. Peoples; Vaughn A. Squires, both of Grove City, Pa.

[73] Assignee: Gas Research Institute, Chicago, Ill.

[21] Appl. No.: 326,596

[22] Filed: Oct. 20, 1994

[51] Int. Cl.$^6$ ................................................. F02B 37/00
[52] U.S. Cl. ............................................................. 60/612
[58] Field of Search ................................................. 60/612

[56] References Cited

U.S. PATENT DOCUMENTS

| | | |
|---|---|---|
| 2,380,777 | 7/1945 | Moss . |
| 4,091,772 | 5/1978 | Heater et al. . |
| 4,306,526 | 12/1981 | Schaub et al. . |
| 4,400,945 | 8/1983 | Deutschmann et al. . |
| 4,418,536 | 12/1983 | Deutschmann . |
| 4,464,902 | 8/1984 | Mendle et al. . |
| 4,557,111 | 12/1985 | Haussmann et al. . |
| 4,656,834 | 4/1987 | Elpern . |
| 4,708,094 | 11/1987 | Helmich et al. . |
| 4,955,326 | 9/1990 | Helmich . |
| 4,966,103 | 10/1990 | Schaub et al. . |
| 4,982,567 | 1/1991 | Hashimoto et al. . |
| 4,993,228 | 2/1991 | Tashima et al. ................... 60/612 |
| 5,109,674 | 5/1992 | Sudmanns . |
| 5,117,801 | 6/1992 | Schaub et al. . |
| 5,199,261 | 4/1993 | Baker . |

FOREIGN PATENT DOCUMENTS

| | | | |
|---|---|---|---|
| 417742 | 1/1922 | Japan | ................... 60/612 |
| 52-44317 | 4/1977 | Japan | ................... 60/612 |
| 2-125926 | 5/1990 | Japan | ................... 60/612 |
| 2005765 | 4/1979 | United Kingdom | ................... 60/612 |

*Primary Examiner*—Michael Koczo
*Attorney, Agent, or Firm*—Speckman, Pauley & Fejer

[57] ABSTRACT

An apparatus and method for establishing parallel flow to and from a plurality of turbochargers operating in parallel. The turbochargers are mounted on a manifold that has a high pressure chamber and a low pressure chamber. A plurality of turbines are mounted to the manifold so that each turbine inlet is in communication with the high pressure chamber and each turbine outlet is in communication with the low pressure chamber. Each turbine inlet is sized, shaped and positioned to accommodate a designed proportional mass flow rate to each corresponding turbine. A programmed logic controller and suitable control valve can be used to bypass a portion of the engine exhaust gas from the high pressure chamber directly to the low pressure chamber. The amount of bypassed engine exhaust gas can be controlled to vary the power output of turbines.

21 Claims, 6 Drawing Sheets

APPARATUS AND METHOD FOR MOUNTING AND OPERATING MULTILE TURBOCHARGERS IN PARALLEL

BACKGROUND OF THE INVENTION

1. Field of the Invention

This invention relates to a manifold for mounting a plurality of turbochargers within an efficient space density, so that the turbines are driven in parallel from engine exhaust gas flowing from a high pressure chamber within the manifold and the turbines discharge into a common low pressure chamber within the manifold. A baffle is positioned within the manifold to separate the high pressure chamber from the low pressure chamber, and to make efficient space density use of the manifold for mounting the multiple turbochargers.

2. Description of Prior Art

Lean combustion is a well known technique for reducing nitrogen oxides ($NO_x$) for natural gas spark-ignited two-cycle engines. Recent environmental regulations require maximum allowable $NO_x$ emissions that are lower than the levels at which many existing natural gas combustion engines operate. It is known that such existing natural gas combustion engines can operate at the reduced $NO_x$ emission levels if the air/fuel ratio is increased to the lean limit by use of turbochargers to significantly increase the air flow to the engine. However, depending upon the particular existing unit and the desired $NO_x$ emissions and fuel consumption levels, the cost of hardware alone for a custom designed single turbocharger unit can range from $US 300,000 to over $US 1,000,000. In addition, costs for labor and auxiliary equipment required for installation of such custom hardware could even equal the hardware costs. Thus, there is an apparent need for an apparatus and method that can be used to retrofit existing natural gas combustion engines, at a much reduced cost than the cost associated with a custom designed single turbocharger.

U.S. Pat. No. 4,464,902 discloses an apparatus having multiple turbochargers with a common exhaust housing. Two turbines are connected together and mounted on central support brackets. A common turbine discharge housing deflects turbine exhaust toward an outlet funnel. Diffuser horns and hollow central plugs are used to establish static pressure and thus uniform gas flow pressure distribution throughout the outlet funnel. Each turbine is equipped with a separate turbine casing which handles independent inlet flow to the corresponding turbine.

U.S. Pat. No. 4,400,945 teaches multiple exhaust gas turbochargers. The turbines of the exhaust gas turbochargers and the exhaust gas conduits are located within an interior of at least one housing which is arranged on an internal combustion engine. The compressors of the exhaust gas turbochargers and the associated air conduits are located on the exterior of the housing or housings.

The prior art does not seem to teach an apparatus that can be used to mount multiple conventional or off-the-shelf turbocharger units within an efficient space density, for the purpose of operating the off-the-shelf turbochargers in parallel to accomplish flow similar to that of a custom designed single turbocharger unit.

SUMMARY OF THE INVENTION

It is one object of this invention to provide an apparatus for mounting a plurality of turbochargers to a manifold in an efficient space density manner.

It is another object of this invention to provide an apparatus and method that enables conventional and readily available turbochargers to operate in parallel to achieve specific overall flow requirements, in lieu of a custom designed single turbocharger unit.

It is another object of this invention to provide an apparatus having a baffle mounted within a manifold wherein the baffle seals a high pressure chamber within the manifold from a low pressure chamber within the manifold.

It is another object of this invention to accomplish controlled proportional parallel flow through a plurality of turbines of the turbochargers.

It is still another object of this invention to control the total mass flow rate of engine exhaust gas through the turbines as a function of the engine demand.

The above and other objects of this invention are accomplished with an apparatus for mounting a plurality of turbochargers and establishing parallel flow of pressurized fluid from the turbochargers. In one preferred embodiment according to this invention, a manifold has an inlet and an outlet. A baffle is positioned within the manifold and forms a low pressure chamber and a high pressure chamber within the manifold. Engine exhaust gas, such as from a two-cycle natural gas fired internal combustion engine, is introduced through the manifold inlet and into the high pressure chamber of the manifold. A plurality of turbines, preferably radial turbines, are mounted to the manifold. A turbine inlet of each turbine is in communication with the high pressure chamber and thus the engine exhaust gas flows through the turbines in parallel.

The mass flow rate of engine exhaust gas to each turbine is preferably controlled in a proportional fashion so that each turbine receives a predetermined mass flow rate. In one preferred embodiment, each turbine receives an approximately equal mass flow rate of the engine exhaust gas. Each turbine discharges into a plenum which is in communication with the low pressure chamber of the manifold.

The total mass flow rate of engine exhaust gas passing through the turbines can be varied by controlling a bypass flow rate of engine exhaust gas passing from the high pressure chamber directly to the low pressure chamber. In one preferred embodiment according to this invention, a control valve is used to control the amount of engine exhaust gas passing through a bypass conduit which is in communication with and between the high pressure chamber and the low pressure chamber. A programmed logic controller preferably receives a temperature input signal corresponding to a temperature of combustion air at an inlet to compressors of the turbochargers and/or a speed input signal corresponding to the speed of a combustion engine that receives pressurized combustion air from the compressors. The programmed logic controller emits an output signal to the control valve. The output signal is preferably computed as a function of the temperature input signal and the speed input signal, according to a programmed air/fuel ratio schedule.

The apparatus of this invention can be constructed with a relatively low cost retrofit package for modifying existing natural gas combustion engines. Commercially available standard turbochargers can be used in a parallel flow arrangement to provide flow conditions that would otherwise be available only through a custom designed single turbocharger unit. The turbochargers provide highly dilute combustion which results in relatively low $NO_x$ emission rates. Adding multiple turbochargers according to this invention, particularly in a cost-effective manner, to an existing natural gas combustion engine can result in as much as a 70% reduction in $NO_x$ emission rates, without a corresponding increase in hydrocarbon emission rates.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
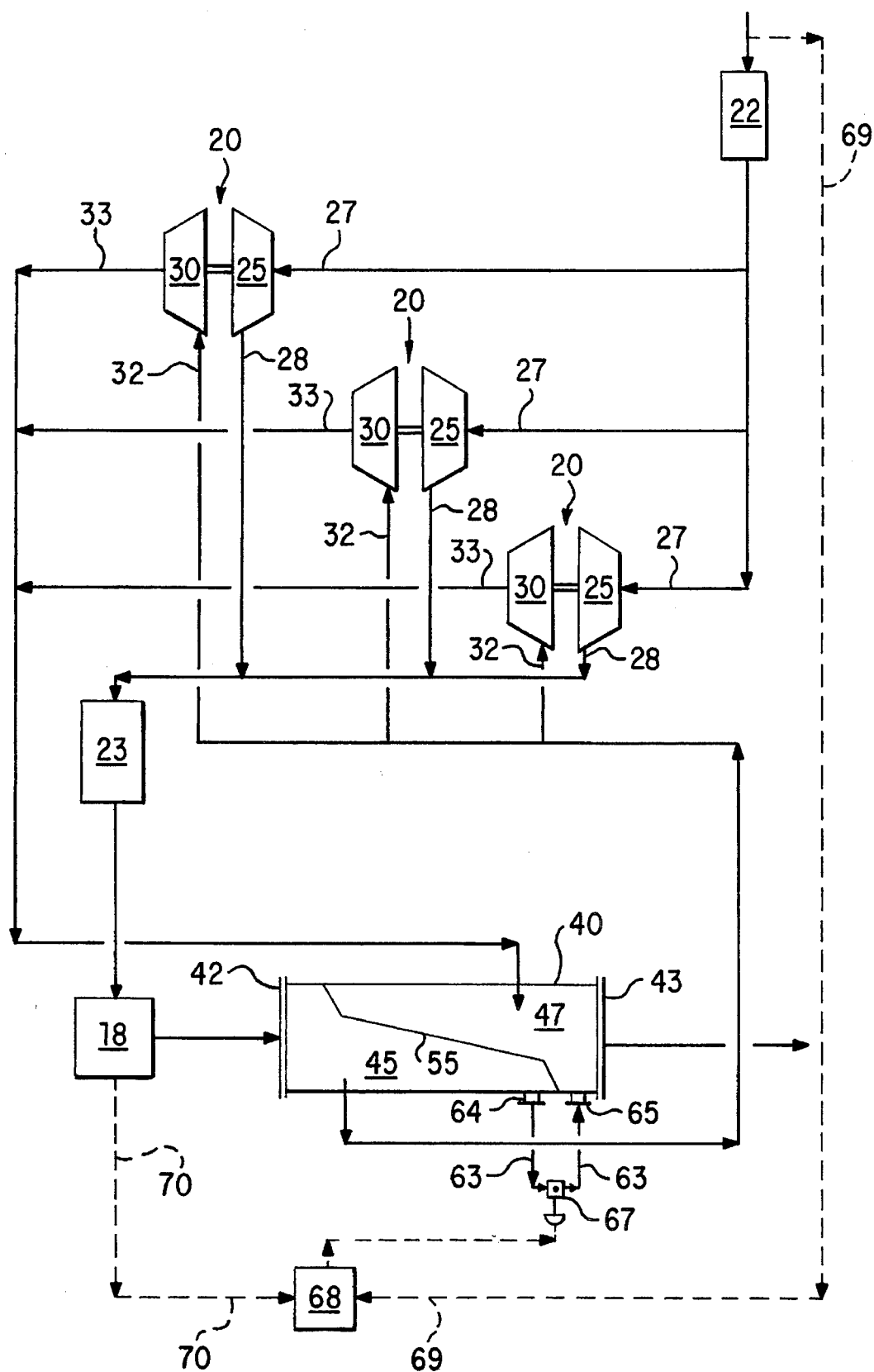
FIG. 1 is a diagrammatic view of components of and flow through a multiple turbocharger unit, according to one preferred embodiment of this invention.
Figure 2:
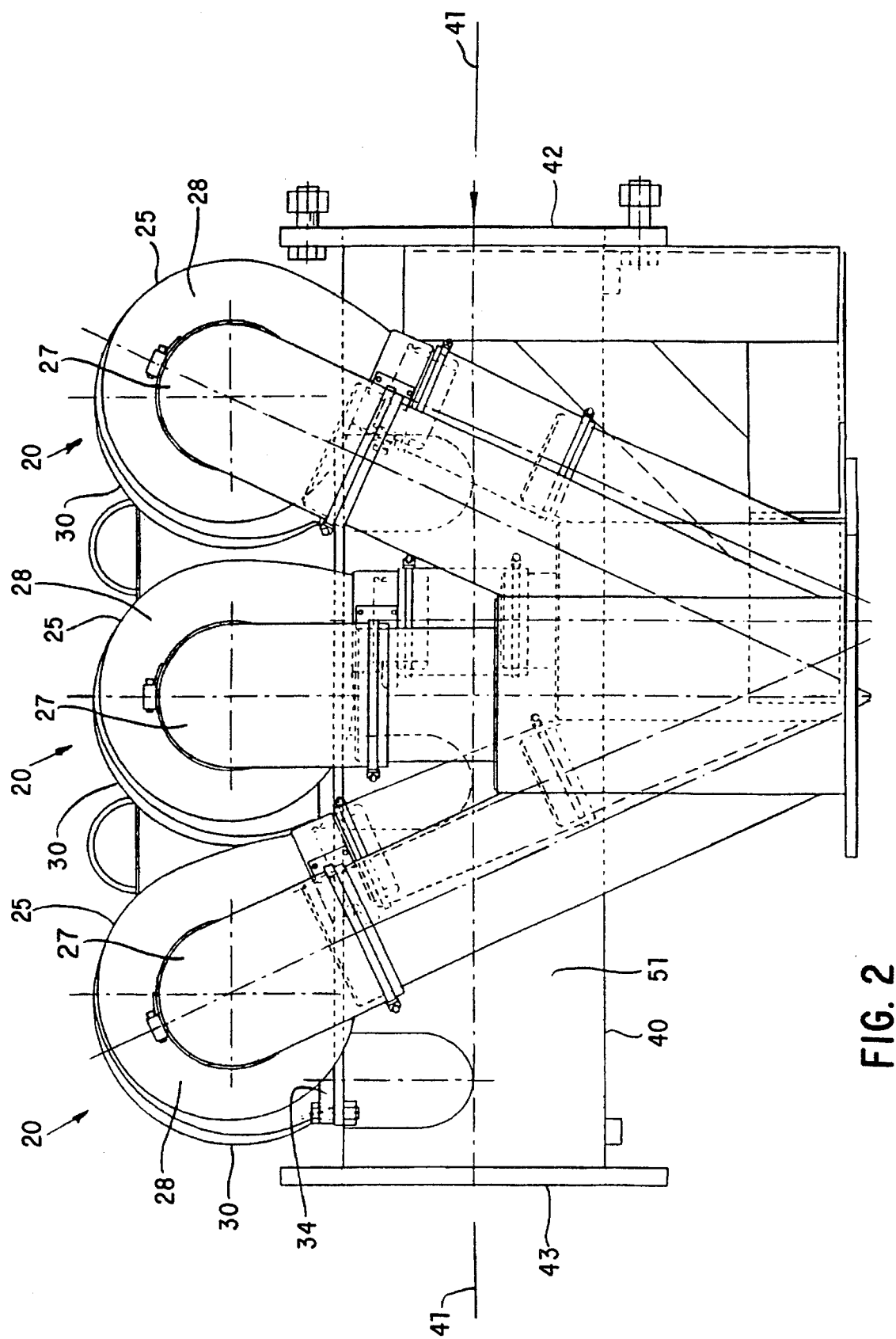
FIG. 2 is a front view of a three-turbocharger unit mounted to a single manifold, according to one preferred embodiment of this invention.
Figure 3:
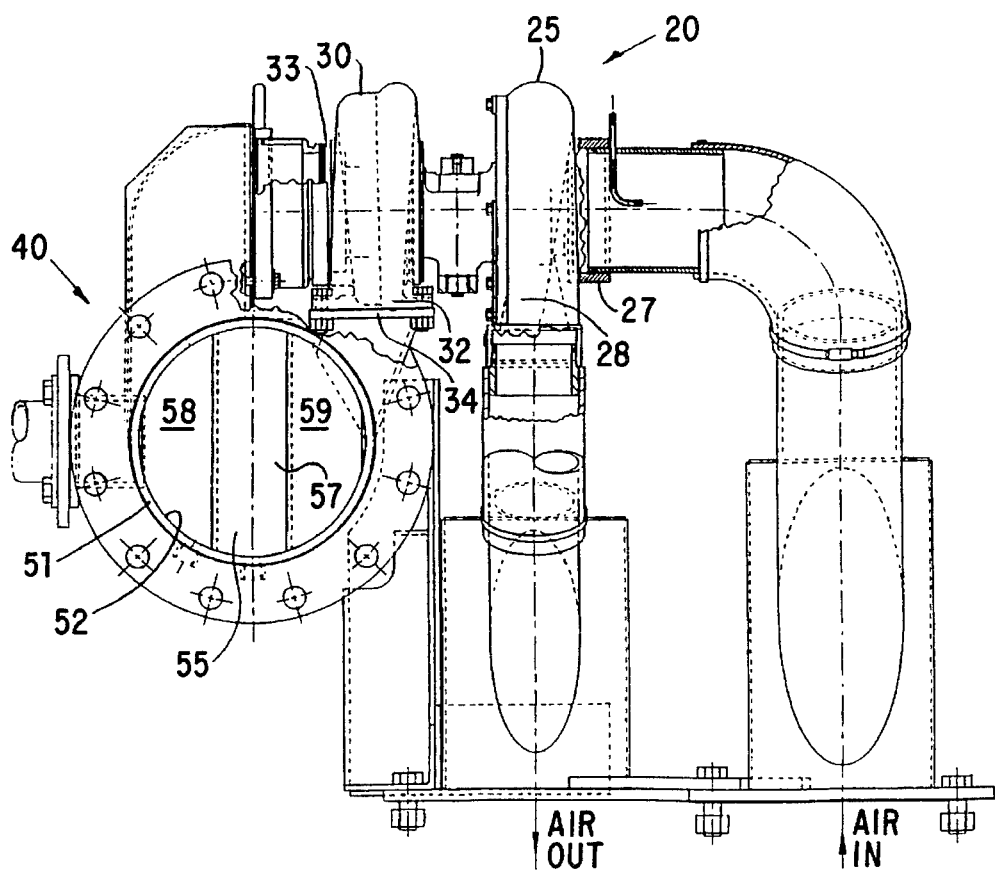
FIG. 3 is a side view of the three-turbocharger unit shown in FIG. 2.
Figure 4:
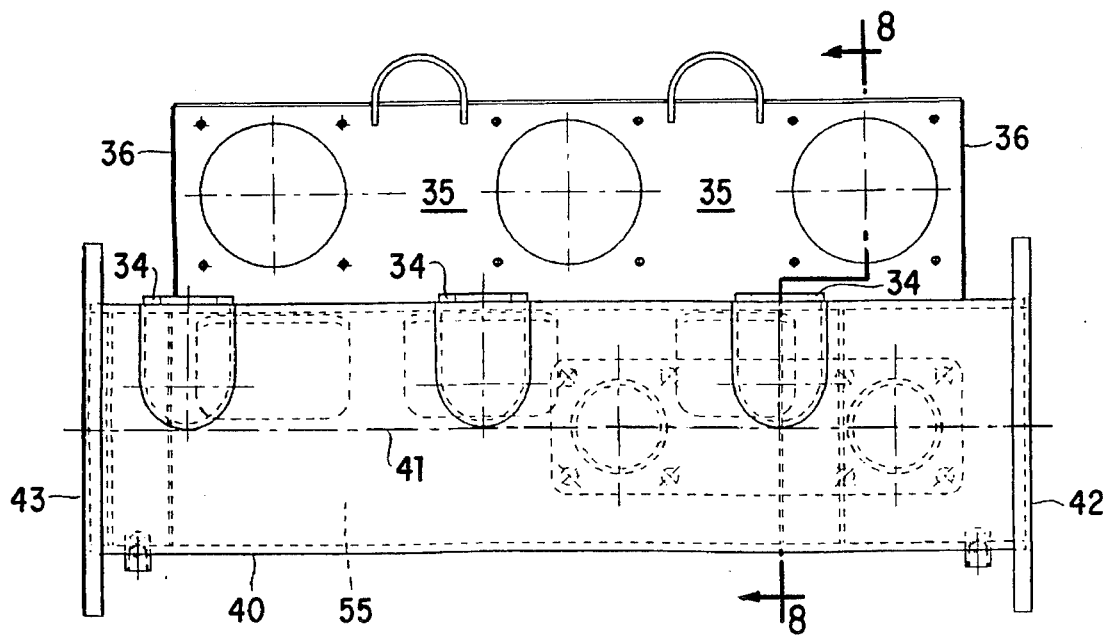
FIG. 4 is a front view of a manifold which accommodates three turbines of three corresponding turbochargers, according to one preferred embodiment of this invention.
Figure 11:
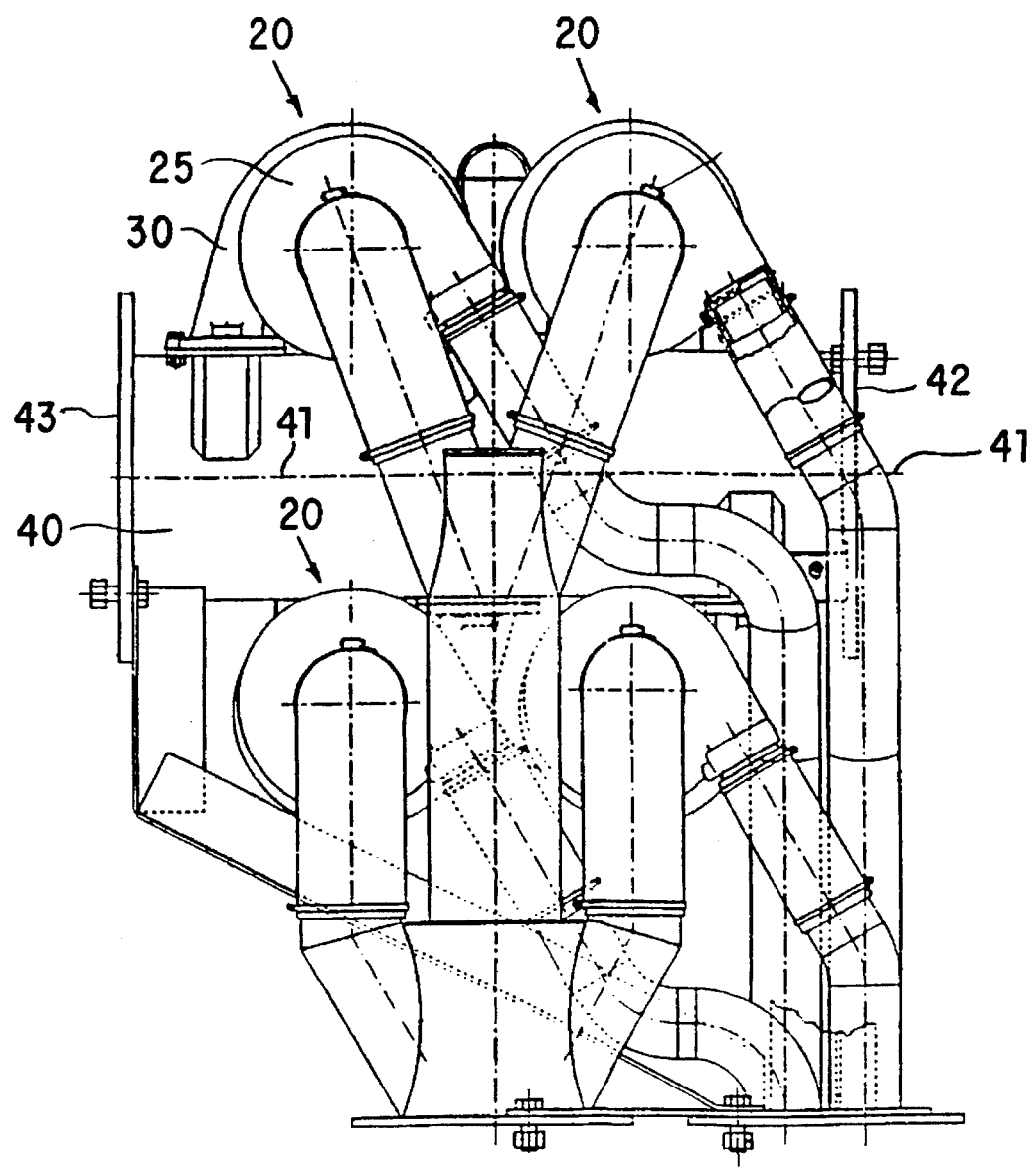
FIG. 11 is a front view showing a four-turbocharger unit, according to another preferred embodiment of this invention.

FIG. 1 is a schematic diagram of a three-turbocharger unit and a common manifold that accommodates parallel flow to and from each turbine. FIGS. 2 and 3 are front and side views, respectively, which also show a three-turbocharger unit. FIG. 11 is a front view of a four-turbocharger unit, according to another preferred embodiment of this invention.

The apparatus and method according to this invention are particularly useful for retrofitting an existing engine, such as a two-cycle internal combustion engine which is fired with either natural gas or another suitable fuel, by adding a turbocharger system. Because of the various flow conditions required by differently sized engines, custom designing a single turbocharger unit for each set of conditions required by different types of engines would be cost prohibitive. The apparatus according to this invention provides an efficient space density manner in which a plurality of readily available conventional or off-the-shelf turbocharger units can be mounted to provide acceptably close to the same flow parameters as a custom designed single turbocharger unit. According to the apparatus and method of this invention, the total mass flow rate to the turbines can be controlled so that the compression side of the multiple turbocharger unit produces the desired flow parameters required by the engine.

Figure 5:
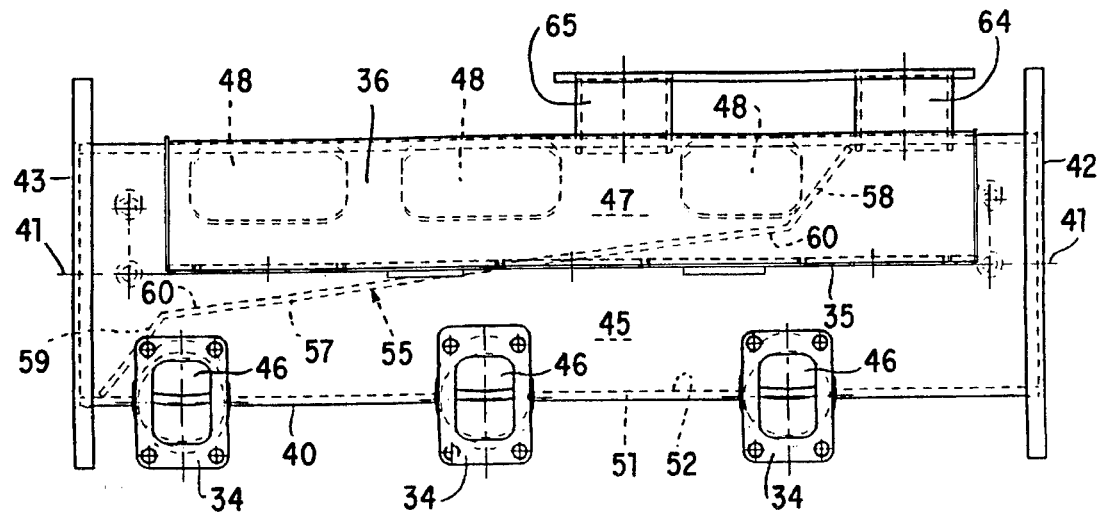
FIG. 5 is a top view of the manifold shown in FIG. 4.

Referring now to FIG. 1, the multiple turbocharger unit according to this invention establishes parallel flow to and from a plurality of turbines 30 and a plurality of compressors 25. As shown in FIG. 1, manifold 40 forms high pressure chamber 45 and low pressure chamber 47. Exhaust gas from engine 18 is introduced into high pressure chamber 45. Engine exhaust gas is directed through ports 46, as shown in FIG. 5 and then into turbine inlets 32. The engine exhaust gas expands through and rotates each turbine 30 and then discharges into common low pressure chamber 47. Each turbine 30 is preferably a radial turbine wherein the engine exhaust gas enters circumferentially and discharges axially. From FIG. 1, it is apparent that the engine exhaust gas passes in parallel from the common high pressure chamber 45 to turbine inlets 32, and that the discharged engine exhaust gas passes in parallel through turbine outlets 33 and then into the common low pressure chamber 47.

Figure 6:
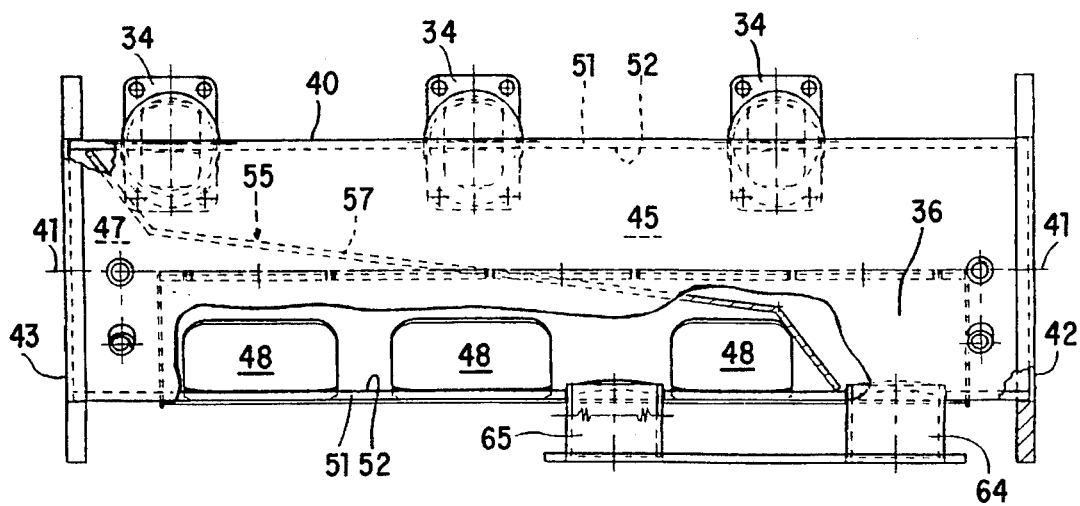
FIG. 6 is a bottom partial cross-sectional view of the manifold shown in FIG. 4.
Figure 7:
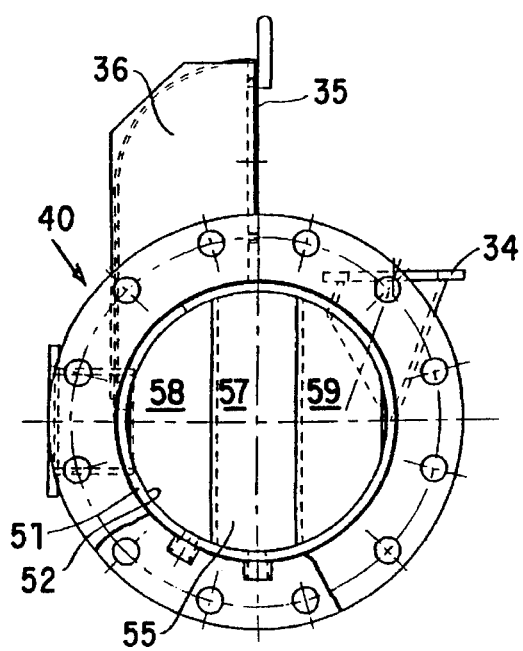
FIG. 7 is a side view, as seen from the left as shown in FIG. 4, of the manifold shown in FIG. 4.
Figure 8:
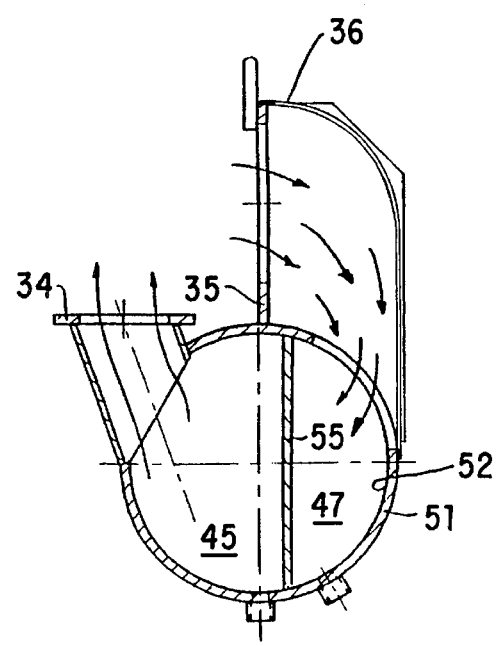
FIG. 8 is a sectional view taken along the line 88, as shown in FIG. 4.
Figure 10:
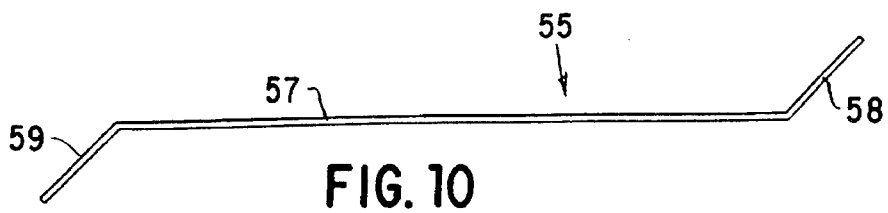
FIG. 10 is a top view of the baffle shown in FIG. 9.
Figure 9:
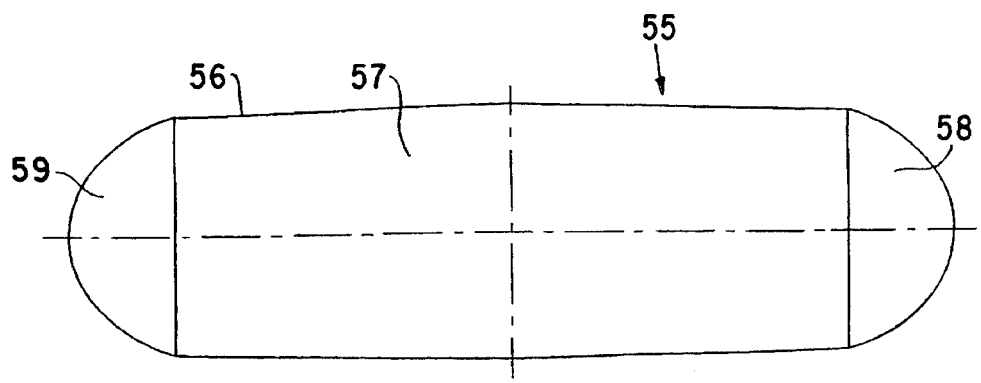
FIG. 9 is a front view of a baffle, according to one preferred embodiment of this invention.

As shown in FIGS. 5 and 6, manifold 40 has manifold inlet 42 which is in communication with high pressure chamber 45, and also has manifold outlet 43 which is in communication with low pressure chamber 47. Separation means are used to seal high pressure chamber 45 with respect to low pressure chamber 47. In one preferred embodiment according to this invention, such separation means comprise baffle 55, as shown in FIGS. 9 and 10. Baffle 55 is shown in a mounted position in FIGS. 4–8. FIG. 10 is a top view of only baffle 55 that shows end portions 58 and 59 extending from opposite ends of central portion 57. End portions 58 and 59 are angled with respect to central portion 57. Although FIG. 10 shows end portions 58 and 59 angled at approximately 45° C. with respect to central portion 57, such particular angle can vary according to the geometrical configuration of manifold 40. As clearly shown in FIGS. 5 and 6, baffle 55 is positioned at an acute angle with respect to longitudinal axis 41. As shown in FIGS. 5 and 6, such acute angle is in the range of approximately 6.25° C. to approximately 8.25° C., and preferably 7.25° C. However, it is apparent that such angle can also vary depending upon the geometrical arrangement of manifold 40.

Manifold 40 is preferably constructed of generally tubular material and has ports 46 within sidewall 51, which are in communication with high pressure chamber 45, as well as ports 48 within sidewall 51, which are in communication with low pressure chamber 47. Ports 46 are used to feed engine exhaust gas into turbine inlets 32. As best shown in FIG. 5, ports 46 are preferably similarly shaped and sized. Such design feature of ports 46 provides approximately equal proportional mass flow rates through each turbine 30. It is apparent that ports 46 can be sized, shaped and positioned to vary the proportional mass flow rate through each turbine 30, and can also be designed to accommodate various conventional turbochargers. Quite often, turbocharger manufacturers specify the precise size, shape and position of the port for feeding the turbine inlet. In such instances, ports 46 according to this invention can be easily modified, since the manifold containing ports 46 can be detachably secured and thus interchangeable with respect to manifold 40.

Baffle 55 is preferably constructed of plate material. When positioned within manifold 40, baffle 55 has one face surface 60 exposed to low pressure chamber 47, and another opposite face surface 60 exposed to high pressure chamber 45. Baffle 55 is preferably sealably secured to inner surface 52 of side wall 51 of manifold 40, along the entire peripheral edge 56 of baffle 55. In one preferred embodiment according to this invention, baffle 55 is welded to inner surface 52. It is apparent that other suitable means can be used to secure baffle 55 with respect to side wall 51. Preferably, regardless of the means for attaching, high pressure chamber 45 is hermetically sealed with respect to low pressure chamber 47.

The total mass flow rate of engine exhaust gas passing through turbines 30 can be controlled by bypassing at least a portion of the engine exhaust gas from high pressure chamber 45 directly to low pressure chamber 47. In one preferred embodiment, baffle 55 can have a through hole, check valve or other suitable opening for bypassing the exhaust engine gas. As shown in FIG. 1, according to another preferred embodiment of this invention, bypass conduit 63 can be used to form communication between high pressure chamber 45 and low pressure chamber 47. Control means can be used to vary the bypass flow rate of the engine exhaust gas through bypass conduit 63. According to one preferred embodiment of this invention, such flow control means comprise flow control valve 67 mounted within bypass conduit 63, as shown in FIG. 1. Referring to FIG. 6, high pressure bypass nozzle 64 which is in communication with high pressure chamber 45 can be used to connect to one end of bypass conduit 63. Likewise, low pressure bypass nozzle 65, which is in communication with low pressure chamber 47, can be used to connect the opposite end of bypass conduit 63. It is apparent that flow control valve 67 can be a butterfly control valve, or any other suitable control valve or flow control means apparent to those skilled in the art.

Computer means 68, as shown in FIG. 1, can be used to calculate a required bypass flow rate. In one preferred embodiment according to this invention, computer means 68 comprise a programmed logic controller that receives one or more input signals and calculates, as a function of a programmed air/fuel ratio schedule, the necessary bypass flow rate and emits a bypass flow rate signal to the flow control means. Computer means 68 may receive an air/inlet temperature input signal 69 which corresponds to the temperature of inlet air being admitted to compressor inlet 27. Suitable temperature sensor means, such as a thermocouple or another suitable temperature measuring device apparent to those skilled in the art, can be used to sense the temperature of such inlet air. Computer means 68 may also receive a speed input signal 70 which corresponds to a rotational speed of engine 18. The particular speed sensor means for sensing and emitting the speed input signal would also be apparent to a person skilled in the art.

Computer means 68 can compute the required bypass flow rate as a function of the air inlet temperature and/or the engine speed. It is also apparent that other flow or operational parameters can be used to control the amount of engine exhaust gas bypassed from high pressure chamber 45 directly to low pressure chamber 47. By varying the bypass flow rate, a different total mass flow rate can be passed through turbines 30, thus resulting in various flow parameters capable of being discharged from compressor outlets 28.

Referring to FIG. 1, one preferred method according to this invention comprises two separate flow circuits and flow mediums. In one flow circuit, engine exhaust gas is introduced into low pressure chamber 45 of manifold 40. At least a portion of the engine exhaust gas is directed through turbines 30. Any remaining portion, if desired, of the engine exhaust gas can be bypassed as previously discussed. Each turbine 30 eventually discharges into the common low pressure chamber 47. From low pressure chamber 47, the engine exhaust gas preferably flows to a turbine stack, which can comprise a muffler. With manifold 40 according to this invention, as best shown in FIG. 8, each turbine 30 can have a turbine inlet flange mounted to flange 34 and a turbine outlet flange mounted to wall 35 of plenum 36. FIG. 3 also shows such mounting of turbine 30. It is apparent that flange 34 and wall 35 can be designed to accommodate a wide variety of readily available conventional and off-the-shelf turbocharger units.

Each turbine 30 preferably drives one corresponding compressor 25. In another flow circuit, atmospheric combustion air preferably enters compressor inlet 27. The atmospheric combustion air can first pass through filter 22, as shown in FIG. 1. Each compressor 25 preferably discharges into a common collector 23. The pressurized combustion air is then discharged from collector 23 to an intake of engine 18.

Computer means 68 and control valve 67 are used to vary the amount of bypassed engine exhaust gas and thus vary the rotational speed and power output of turbines 30.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. An apparatus for mounting a plurality of turbochargers and establishing parallel flow of pressurized fluid from the turbochargers, the apparatus comprising:

a manifold having a manifold inlet and a manifold outlet, separation means for forming a low pressure chamber and a high pressure chamber within said manifold, said manifold inlet in communication with said high pressure chamber, said manifold outlet in communication with said low pressure chamber;

the turbochargers each comprising a turbine, each said turbine having a turbine inlet in communication with said high pressure chamber and a turbine outlet in communication with said low pressure chamber; and proportioning means for providing a proportional mass flow rate to each said turbine inlet.

2. An apparatus according to claim 1 wherein said manifold is tubular and has a plurality of ports within a sidewall of the manifold.

3. An apparatus according to claim 2 wherein said separation means comprise a baffle mounted within said manifold, and at least a portion of a peripheral edge of said baffle sealably secured to an inner surface of said sidewall.

4. An apparatus according to claim 3 wherein said manifold has a longitudinal axis, and said baffle comprises a generally planar central portion positioned at an acute angle with respect to said longitudinal axis.

5. An apparatus according to claim 4 wherein said baffle further comprises two generally planar end portions each extending from opposite ends of said central portion, and each said end portion angled with respect to said central portion.

6. An apparatus according to claim 4 wherein said acute angle is in a range of approximately 6.25° to approximately 8.25°.

7. An apparatus according to claim 3 wherein said baffle has a plurality of opposing face surfaces, one of said face surfaces is exposed to said low pressure chamber and another of said face surfaces is exposed to said high pressure chamber.

8. An apparatus according to claim 2 wherein each said port is sized, shaped and positioned to accommodate said proportional mass flow rate.

9. An apparatus according to claim 1 wherein said proportioning means provides an approximately equal said mass flow rate to each said turbine inlet.

10. An apparatus according to claim 1 wherein said low pressure chamber is hermetically sealed from said high pressure chamber.

11. An apparatus according to claim 1 further comprising a bypass conduit in communication with said low pressure chamber and said high pressure chamber, and flow control means for varying a bypass flow rate of said engine exhaust gas through said bypass conduit.

12. An apparatus according to claim 11 wherein said flow control means comprise a control valve mounted within said bypass conduit.

13. An apparatus according to claim 11 further comprising computer means for calculating a required bypass flow rate as a function of a programmed air/fuel ratio schedule.

14. An apparatus according to claim 13 wherein said computer means receives an air inlet temperature input signal from temperature sensor means for sensing a temperature of inlet air being admitted to a plurality of compressors of said turbochargers, and said computer means calculates said required bypass flow rate as a function of said temperature and emits a corresponding bypass flow rate signal to said flow control means.

15. An apparatus according to claim 13 wherein said computer means receives a speed input signal from speed sensor means for sensing a speed of an engine receiving combustion air from a plurality of compressors of said turbochargers, and said computer means calculates said required bypass flow rate as a function of said speed and emits a corresponding bypass flow rate signal to said flow control means.

16. A method for establishing parallel flow to and from a plurality of turbochargers operating in parallel, the method comprising:

(a) introducing engine exhaust gas into a common high pressure chamber of a manifold;

(b) directing the engine exhaust gas, using a baffle mounted within the manifold, through a turbine inlet of each of a plurality of turbines of the turbochargers;

(c) proportionally controlling a mass flow rate of the engine exhaust gas passing through the turbine inlets; and (d) discharging the engine exhaust gas from a turbine outlet of each of the turbines into a common low pressure chamber of the manifold.

17. A method according to claim 16 wherein the mass flow rate is approximately equally proportioned to each of the turbine inlets.

18. A method according to claim 16 further comprising bypassing at least a portion of the engine exhaust gas from the high pressure chamber to the low pressure chamber to control the mass flow rate of the engine exhaust gas passing through the turbine inlets.

19. A method according to claim 18 wherein the at least a portion of the engine exhaust gas is bypassed through a bypass conduit in communication with the high pressure chamber and the low pressure chamber, and a control valve is used to vary a bypass flow rate of the engine exhaust gas through the bypass conduit.

20. A method according to claim 18 wherein a bypass flow rate of the engine exhaust gas is controlled with a programmed logic controller that receives an air inlet temperature input signal representing a temperature of inlet air being admitted to a plurality of compressors of the turbochargers, calculates a required bypass flow rate as a function of the temperature and an air/fuel ratio schedule, and emits a corresponding bypass flow rate signal to the control valve.

21. A method according to claim 18 Wherein a bypass flow rate of the engine exhaust gas is controlled with a programmed logic controller that receives a speed input signal representing a speed of an engine receiving combustion air from a plurality of compressors of the turbochargers, calculates a required bypass flow rate as a function of the speed and an air/fuel ratio schedule, and emits a corresponding bypass flow rate signal to the control valve.

* * * * *